United States Patent [19]

Knobel

[11] 3,771,378

[45] Nov. 13, 1973

[54] VARIABLE RATIO BELT DRIVE

[76] Inventor: William E. Knobel, 1726 Walla Walla, Walla Walla, Wash. 99362

[22] Filed: June 28, 1972

[21] Appl. No.: 267,261

[52] U.S. Cl. .................... 74/230.17 E, 74/230.17 F
[51] Int. Cl. ........................................... F16h 55/52
[58] Field of Search ............ 74/230.17 E, 230.17 F, 74/230.17 A

[56] References Cited
UNITED STATES PATENTS

| | | | |
|---|---|---|---|
| 2,987,934 | 6/1961 | Thomas | 74/230.17 E |
| 3,698,256 | 10/1972 | Albertson | 74/230.17 E |
| 2,916,024 | 12/1959 | Dodge | 74/230.17 E |
| 3,653,283 | 4/1972 | Betz | 74/230.17 F |

FOREIGN PATENTS OR APPLICATIONS

| | | | |
|---|---|---|---|
| 1,146,756 | 5/1957 | France | 74/230.17 F |

Primary Examiner—Charles J. Myhre
Assistant Examiner—R. H. Lazarus
Attorney—Harvey B. Jacobson

[57] ABSTRACT

A drive assembly including a pair of opposing pulley flanges mounted for rotation together about concentric axes and shiftable axially relative to each other. First structure is provided to yieldingly bias one of the flanges in a first direction relative to the other flange and second structure is provided and responsive to rotational speed of the flanges to urge the flange acted upon by the first structure in the opposite direction with a force increasing as the speed of rotation of the flanges increases. In addition, third deactivatable structure is provided to selectively prevent movement of the one flange under the influence of the second structure.

6 Claims, 5 Drawing Figures

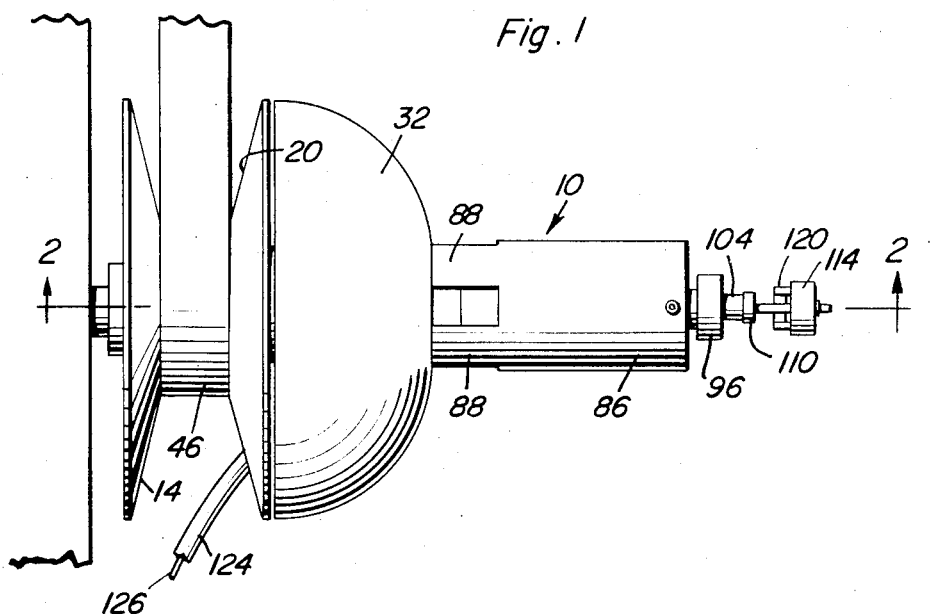
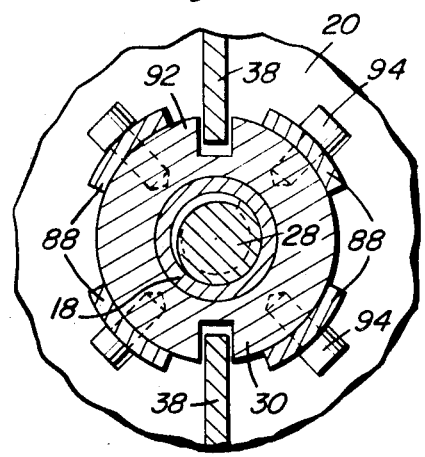
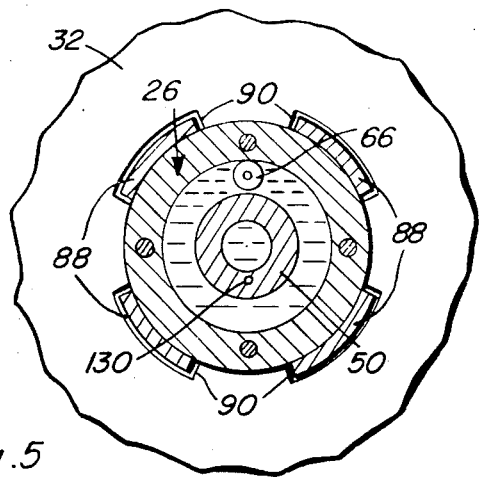
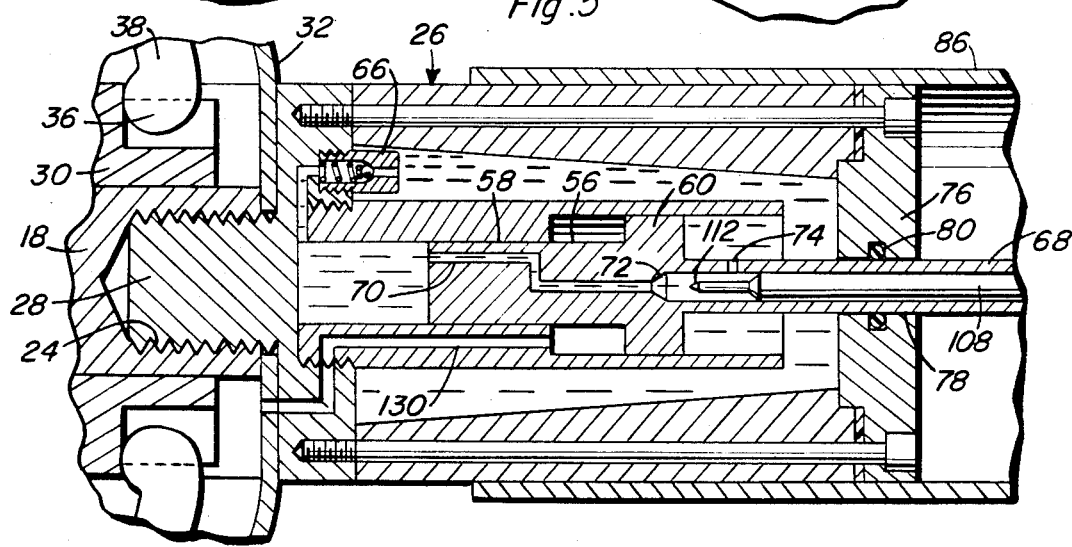

VARIABLE RATIO BELT DRIVE

The variable ratio belt drive assembly of the instant invention has been primarily designed for use on vehicles utilizing variable ratio belt drives. Such vehicles may include, but are not necessarily limited to, snowmobiles.

In a snowmobile the engine drives the endless track of the snowmobile through a variable ratio belt drive assembly with a numerically high ratio at relatively slow endless track speeds. As the speed of the endless track assembly of the snowmobile increases, the numerical ratio of the drive assembly decreases.

However, there are many instances when extreme terrain conditions dictate that in order to maintain optimum performance the drive ratio of the drive assembly of a snowmobile must be maintained numerically higher than would ordinarily be dictated by the speed of the associated endless track assembly. In addition, there are many instances when the load being carried by a snowmobile dictates the need for a numerically higher drive ratio than that which is ordinarily provided by the conventional variable ratio belt drive system. Still further, should a snowmobile be utilized to tow a sled or a second disabled snowmobile, considerably higher drive ratios are required than that which is normally provided by conventional variable ratio belt drive assemblies at a given speed of the associated endless track assembly.

It is accordingly the main object of this invention to provide a variable ratio belt drive assembly including means whereby further lowering of the numerical ratio of the drive assembly may be prevented at any time.

Another object of this invention, in accordance with the immediately preceding object, is to provide a belt drive assembly including a manual control that may be readily actuated whenever desired.

A still further object of this invention is to provide a variable ratio belt drive assembly in accordance with the preceding objects and whose structure for selectively terminating the reduction of the numerical drive ratio will allow conventional increases in the numerical drive ratio determined by decreases in operating speed of the associated endless track assembly.

A final object of this invention to be specifically enumerated herein is to provide a variable ratio belt drive assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view of a variable ratio belt drive assembly constructed in accordance with the present invention;

FIG. 3 is a fragmentary transverse vertical sectional view taken substantially upon the plane indicated by the section line 3—3 of FIG. 2;

FIG. 4 is a fragmentary transverse vertical sectional view taken substantially upon the plane indicated by the section line 4—4 of FIG. 2; and FIG. 5 is an enlarged fragmentary longitudinal vertical sectional view similar to the right central portion of FIG. 2 but on a further enlarged scale and with the relatively shiftable components in slightly different positions.

Figure 2:
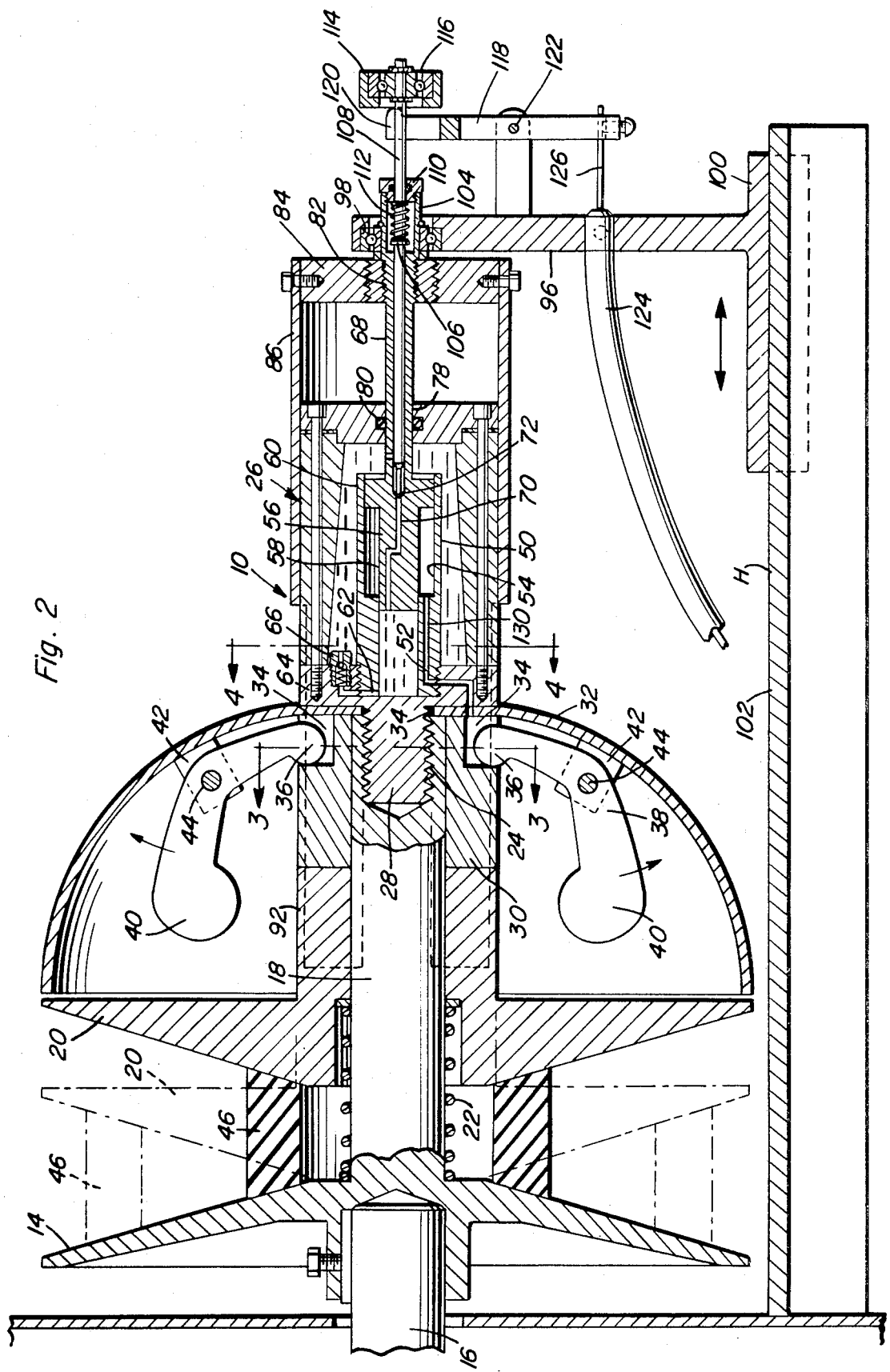
FIG. 2 is an enlarged vertical longitudinal sectional view taken substantially upon the plane indicated by the section line 2—2 of FIG. 1.

Referring now more specifically to the drawings, the numeral 10 generally designates the variable ratio belt drive assembly of the instant invention. The assembly 10 includes a first pulley flange 14 mounted on and keyed to a power output shaft 16. The pulley 14 includes a cylindrical center shaft portion 18 upon which a second pulley flange 20 is mounted for rotation therewith and axial shifting therealong. An expansion spring 22 is disposed about the shaft portion 18 between the flanges 14 and 20 and yieldingly biases the flange 20 away from the flange 14.

The end of the shaft portion 18 remote from the flange 14 has a threaded blind axial bore 24 formed therein and a cylindrical reservoir 26 is provided with a threaded axial shank 28 on one end threadedly engaged in the bore 24.

A thrust collar 30 is disposed on the shaft portion 18 between the second flange 20 and the free end of the shaft portion 18 and the confronting axial faces of the reservoir 36 and the thrust collar 30 define abutment surfaces between which the central portion of a generally hemispherical shield body 32 is clamped. The body 32 includes a central opening 34 through which the shank 28 is received and the axial end of the thrust collar 30 remote from the second flange 20 includes a pair of diametrically opposite relieved areas 34 in which the rounded ends 36 of a pair of weighted levers 38 are received. The ends of the levers 38 remote from the rounded ends 36 thereof include enlarged weight defining ends 40 and the levers 38 are pivotally supported from brackets 42 carried by the shield 32 by means of pivot fasteners 44.

A drive belt 46 is disposed between the flanges 14 and 20 and rides upon the inner peripheral portions of the flanges 14 and 20 when the flanges are spaced apart and between the outermost peripheral portions of the flanges 14 and 20 when the flanges are spaced close together with the second flange 20 in the phantom line position thereof illustrated in FIG. 2.

Of course, the spring 22 serves to yieldingly bias the second flange 20 away from the first flange 14. However, as the rotational speed of the assembly comprising the flanges 14 and 20 increases, the weighted ends 40 of the levers 38 tend to cause the levers 38 to pivot in directions moving the rounded ends thereof 36 toward the first flange 14 whereupon the thrust collar 30 is biased to the left as viewed in FIG. 2 of the drawings so as to urge the second flange 20 to the left as viewed in FIG. 2 of the drawings toward the phantom line position thereof with the belt 46 disposed between the outer peripheral portions of the flanges 14 and 20. Thus, as the speed of the flanges 14 and 20 increases, the effective diameter of the drive pulley defined by the flanges 14 and 20 is increased.

The preceding description of operation may be considered as generally equivalent to the operation of existing variable ratio belt drive assemblies wherein the speed of rotation of the drive assembly causes the effective diameter of the pulley to be changed.

In order to afford manual control over the belt drive assembly 10, the reservoir 26 is provided and includes an internal cylinder portion 50 defining a first small diameter cylinder bore 52 and a second larger diameter cylinder bore 54. A stepped piston 56 is provided and includes a first small diameter end portion 58 reciprocal in the bore 52 and a second large diameter portion 60 reciprocal in the bore 54.

The end of the bore 52 remote from the bore 54 includes a return passage 62 having a portion thereof formed in the end wall 64 of the reservoir 26 and having a check valve assembly 66 operatively associatd therewith. The piston 56 includes a tubular extension 68 on its end remote from the small diameter portion 58 and also a longitudinal passage 70 formed therethrough having one end opening through the end face of the small diameter portion 58 and the other end opening into the tubular extension 68 through a valve seat 72. The extension 68 includes a radial bore 74 which opens outwardly into the interior of the reservoir 26 adjacent the end wall 76 remote from the end wall 64. The tubular extension extends through a central bore 78 formed in the end wall 76 and provided with an O-ring seal 80 and the end of the extension 68 remote from the piston 56 is threaded through an internally and externally threaded sleeve 82 threaded through the end wall 84 of a cylindrical support or housing 86 telescoped over the reservoir 26, the end of the housing 86 remote from the end wall 84 thereof including circumferentially spaced and axially extending extension fingers 88 passing through slots 90 formed in the shield or cover 32 and secured to the hub portion 92 of the second flange 20 by means of fasteners 94. The terminal end of the tubular extension 68 is journaled from a support 96 by means of a bearing assembly 98 and the support 96 includes a lower foot 100 mounted upon a base 102 for rectilinear reciprocation along a path generally paralleling the axis of rotation of the flanges 14 and 20.

The outer terminal end of the tubular extension 68 includes a counterbore 104 in which an abutment 106 carried by a needle valve shank 108 reciprocal through the extension 68 is disposed. The counterbore 104 is closed by means of an abutment fitting 110 and a compression spring 112 is disposed between the abutment 106 and the abutment fitting 110 so as to yieldingly bias the valve member 108 toward a position with its head 112 seated on the seat 72 so as to close the passage 70. The free terminal end of the needle valve 108 has an abutment sleeve 114 journaled thereon by means of a bearing assembly 116 and a controlling fork lever 118 has its bifurcated end 120 positioned for engagement with the abutment sleeve 114, the lever 118 being pivotally supported from the support 96 by means of a pivot fastener 122. A Bowden cable assembly 124 supported from the support 96 has its core 126 anchored to the end of the lever 118 remote from the abutment sleeve 114 and accordingly, a pull on the core 126 will cause the lever 118 to rotate in a clockwise direction as viewed in FIG. 2 of the drawings so as to withdraw the head 112 of the needle valve 108 from engagement with the seat 72 against the biasing action of the spring 112.

The interior of the reservoir 26 may be filled with any suitable hydraulic fluid, except for a small air pocket to compensate for expansion and contraction of the hydraulic fluid. The interior of the outer portion of the reservoir 26 is conical and the check valve 66 opens into the large diameter end portion of the interior of the reservoir 26 at a point spaced radially inwardly of the outer periphery of the large diameter end portion of the interior of the reservoir 26. Accordingly, during rotation of the reservoir 26 at high speeds any air within the reservoir 26 will be forced by the centrifugal force of the heavier hydraulic fluid toward the center axis of the reservoir 26 and away from the check valve 66.

The reservoir assembly 26 includes a vent passage 130 for venting that portion of the bore 54 adjacent the bore 52.

During normal operation of the belt drive assembly 10, rotation of the assembly 10 at slow speeds does not provide sufficient centrifugal force acting upon the levers 38 to overcome the biasing action of the spring 22 and the latter thus maintains maximum spacing between the flanges 14 and 20. However, as the speed of rotation of the assembly 10 increases, the levers 38 urge the collar 30 and thus the hub portion 92 toward the left as viewed in FIG. 2 of the drawings so as to narrow the spacing between the flanges 14 and 20 and thus increase the effective diameter of the pulley defined by the flanges 14 and 20. However, inasmuch as the housing 86 is secured, by means of the fingers 88 and fasteners 94, to the hub portion 92, movement of the second flange 20 toward the first flange 14 causes the small diameter portion 58 of the piston 56 to move through the bore 52 toward the end wall 64. Inasmuch as hydraulic fluid ahead of the small diameter portion 58 cannot pass through the check valve 66 into the interior of the reservoir 26, the fluid ahead of the piston portion 58 must pass through the passage 70. Therefore, if the head 112 is not seated against the seat 72, fluid from in front of the small diameter portion 58 may pass through the passage 70, into the tubular extension 68 and through the radial passage 74 into the interior of the reservoir 26. However, if the manually actuatable Bowden cable assembly has not been actuated to urge the needle valve member 108 to the right against the biasing action of the spring 112, the spring 112 serves to maintain the head 112 seated against the seat 72 in order to close the passage 70. Therefore, the weighted levers 38, when the passage 70 is closed, are ineffective to reduce the spacing between the flanges 14 and 20, independent of the speed of rotation of the assembly 10. Thus, if a numerically high drive ratio is to be maintained even throughout high speed operation of the assembly 10, the Bowden cable control is not actuated and the valve member 108 is allowed to have its head 110 seated against the seat 72. Of course, whenever it is desired to lower the numerical drive ratio of the assembly 10 after its speed of rotation has been increased to the point wherein the levers 38 will normally cause the flange 20 to be shifted toward the left as viewed in FIG. 2 of the drawings, the Bowden cable assembly 124 may be actuated in order to open the passage 70 and thus allow automatic variations in the drive ratio of the assembly 10.

If the interior of the reservoir 26 is not completely filled with hydraulic fluid, it need not be necessary to provide a stepped piston such as piston 56. Further, it is to be understood that the assembly 10 may find valuable use in many different environments.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A variable ratio belt drive assembly including a pair of opposing pulley flanges mounted for rotation together about concentric axis and shiftable axially relative to each other, means yieldingly biasing one of said flanges in a first direction relative to the other flange, means responsive to rotational speed of said flanges operative to urge said one flange in the opposite direction with the force increasing with increases in the speed of rotation of said flanges, closed liquid reservoir means connected to one of said pulley flanges for rotation therewith and including movable partition means disposed in said reservoir means dividing the interior of the reservoir into two separate chambers and connected to the other pulley flange for shifting therewith to inversely vary the volume of said chambers in response to relative shifting of said pulley flanges, first one-way valved passage means communicating said chambers and allowing liquid flow from one chamber into the other chamber and preventing reverse liquid flow through said passage means from said other chamber into said one chamber, and second passage means communicating said chambers and including manually operable valve means for selectively allowing and terminating liquid flow through said second passage means.

2. The combination of claim 1 wherein said second passage means includes a valve seat concentric with said axis, said valve means including a valve member shiftable axially along said axis and seatingly engageable with said seat to close the latter.

3. The combination of claim 1 wherein said means yieldingly biasing said one flange biases the latter toward the other flange.

4. The combination of claim 1 wherein said reservoir means includes a housing portion disposed substantially concentric with said axis and including a cylinder generally concentric with said axis, said partition means comprising a piston reciprocal in said cylinder, said second passage means comprising a passage formed through said piston.

5. A variable ratio belt drive assembly including a pair of opposing pulley flanges mounted for rotation together about concentric axes and shiftable axially relative to each other, means yieldingly biasing one of said flanges in a first direction relative to the other flange, means responsive to rotational speed of said flanges operative to urge said one flange in the opposite direction with the force increasing with increases in the speed of rotation of said flanges, and deactivatable means operative to prevent movement of said one flange in said opposite direction, said deactivatable means including closed loop liquid passage defining means rotatable with said pulley flanges, said passage defining means including a liquid reservoir serially disposed in said passage means, partition means in said passage means shiftable therein in response to relative shifting of said pulley flanges, first liquid bypass means communicated with said passage means on opposite sides of said partition means and including one-way check valve means for permitting liquid bypass in one direction around said partition and preventing liquid bypass in the other direction, and second liquid bypass means communicated with said passage means on opposite sides of said partition and including manually operable valve means for selectively allowing and preventing liquid flow through said second liquid bypass means in either direction.

6. The combination of claim 5 wherein said manually operable valve means includes an actuator disposed concentric with said axis and shiftable along the latter.

* * * * *